(12) United States Patent
Parakulam et al.

(10) Patent No.: US 8,587,255 B2
(45) Date of Patent: Nov. 19, 2013

(54) CONTROL SYSTEM FOR A FLOW CELL BATTERY

(75) Inventors: Gopalakrishnan R. Parakulam, Cupertino, CA (US); Saroj Kumar Sahu, Mountain House, CA (US); Ali Firouzi, Los Altos, CA (US); Rick Winter, Orinda, CA (US); Jagat Banerjee, Campbell, CA (US); Binod Kumar Agarwal, Gurgaon (IN); PandariNath Siddineni, Bangalore (IN)

(73) Assignee: Deeya Energy, Inc., Fremont, CA (US)

( * ) Notice: Subject to any disclaimer, the term of this patent is extended or adjusted under 35 U.S.C. 154(b) by 410 days.

(21) Appl. No.: 12/790,793

(22) Filed: May 28, 2010

(65) Prior Publication Data

US 2011/0074357 A1    Mar. 31, 2011

Related U.S. Application Data

(60) Provisional application No. 61/182,079, filed on May 28, 2009, provisional application No. 61/182,660, filed on May 29, 2009.

(51) Int. Cl.
*H02J 7/00* (2006.01)

(52) U.S. Cl.
USPC .......................... 320/132; 320/128

(58) Field of Classification Search
USPC .......................... 320/128, 134, 132
See application file for complete search history.

(56) References Cited

U.S. PATENT DOCUMENTS

| | | |
|---|---|---|
| 3,540,934 A | 11/1970 | Boeke |
| 3,996,064 A | 12/1976 | Thaller |
| 4,133,941 A | 1/1979 | Sheibley |
| 4,159,366 A | 6/1979 | Thaller |
| 4,309,372 A | 1/1982 | Sheibley |
| 4,312,735 A | 1/1982 | Grimes et al. |
| 4,414,090 A | 11/1983 | D'Agostino et al. |
| 4,454,649 A | 6/1984 | Jalan et al. |
| 4,468,441 A | 8/1984 | D'Agostino et al. |
| 4,469,760 A | 9/1984 | Giner et al. |
| 4,485,154 A | 11/1984 | Remick et al. |
| 4,496,637 A | 1/1985 | Shimada et al. |
| 4,543,302 A | 9/1985 | Gahn et al. |
| 4,576,878 A | 3/1986 | Gahn |
| 4,732,827 A | 3/1988 | Kaneko et al. |
| 4,784,924 A | 11/1988 | Savinell et al. |
| 4,814,241 A | 3/1989 | Nagashima et al. |

(Continued)

FOREIGN PATENT DOCUMENTS

| | | |
|---|---|---|
| DE | 102006007206 | 10/2006 |
| JP | 60047373 | 3/1985 |

(Continued)

OTHER PUBLICATIONS

ISR and Written Opinion for related PCT Application No. PCT/US2010/036773, dated Feb. 7, 2011.

(Continued)

*Primary Examiner* — Richard V Muralidar
(74) *Attorney, Agent, or Firm* — Haynes and Boone LLP

(57) ABSTRACT

A controller for controlling a flow cell battery system is provided. The controller operates the flow cell battery system in a plurality of states including a plating state, a charging state and a discharge state.

24 Claims, 13 Drawing Sheets

(56) References Cited

U.S. PATENT DOCUMENTS

| | | |
|---|---|---|
| 4,828,666 A | 5/1989 | Iizuka et al. |
| 4,874,483 A | 10/1989 | Wakabayashi et al. |
| 4,882,241 A | 11/1989 | Heinzel |
| 4,894,294 A | 1/1990 | Ashizawa et al. |
| 4,929,325 A | 5/1990 | Bowen et al. |
| 4,945,019 A | 7/1990 | Bowen et al. |
| 4,948,681 A | 8/1990 | Zagrodnik et al. |
| 4,956,244 A | 9/1990 | Shimizu et al. |
| 5,061,578 A | 10/1991 | Kozuma et al. |
| 5,162,168 A | 11/1992 | Downing et al. |
| 5,188,911 A | 2/1993 | Downing et al. |
| 5,258,241 A | 11/1993 | Ledjeff et al. |
| 5,366,824 A | 11/1994 | Nozaki et al. |
| 5,648,184 A | 7/1997 | Inoue et al. |
| 5,650,239 A | 7/1997 | Lex |
| 5,656,390 A | 8/1997 | Kageyama et al. |
| 5,665,212 A | 9/1997 | Zhong et al. |
| 5,759,711 A | 6/1998 | Miyabayashi et al. |
| 5,851,694 A | 12/1998 | Miyabayashi et al. |
| 6,005,183 A | 12/1999 | Akai et al. |
| 6,040,075 A | 3/2000 | Adcock et al. |
| 6,086,643 A | 7/2000 | Clark et al. |
| 6,461,772 B1 | 10/2002 | Miyake et al. |
| 6,475,661 B1 | 11/2002 | Pellegri et al. |
| 6,509,119 B1 | 1/2003 | Kobayashi et al. |
| 6,524,452 B1 | 2/2003 | Clark et al. |
| 6,555,267 B1 | 4/2003 | Broman et al. |
| 6,562,514 B1 | 5/2003 | Kazacos et al. |
| 6,692,862 B1 | 2/2004 | Zocchi |
| 6,759,158 B2 | 7/2004 | Tomazic |
| 6,761,945 B1 | 7/2004 | Adachi et al. |
| 6,764,789 B1 | 7/2004 | Sekiguchi et al. |
| 6,905,797 B2 | 6/2005 | Broman et al. |
| 6,986,966 B2 | 1/2006 | Clarke et al. |
| 7,046,531 B2 | 5/2006 | Zocchi et al. |
| 7,061,205 B2 | 6/2006 | Shigematsu et al. |
| 7,078,123 B2 | 7/2006 | Kazacos et al. |
| 7,181,183 B1 | 2/2007 | Hennessy |
| 7,184,903 B1 | 2/2007 | Williams et al. |
| 7,199,550 B2 | 4/2007 | Tsutsui et al. |
| 7,220,515 B2 | 5/2007 | Ito et al. |
| 7,227,275 B2 | 6/2007 | Hennessy et al. |
| 7,537,859 B2* | 5/2009 | Samuel et al. ............... 429/101 |
| 7,625,663 B2* | 12/2009 | Clarke et al. ................ 429/105 |
| 2003/0008203 A1 | 1/2003 | Winter |
| 2004/0070370 A1 | 4/2004 | Emura |
| 2004/0170893 A1 | 9/2004 | Nakaishi et al. |
| 2004/2002915 | 10/2004 | Nakaishi et al. |
| 2004/0241544 A1 | 12/2004 | Nakaishi et al. |
| 2005/0074653 A1 | 4/2005 | Broman et al. |
| 2005/0156431 A1 | 7/2005 | Hennessy |
| 2005/0156432 A1 | 7/2005 | Hennessy |
| 2005/0158614 A1 | 7/2005 | Hennessy |
| 2005/0158615 A1 | 7/2005 | Samuel et al. |
| 2005/0164075 A1 | 7/2005 | Kumamoto et al. |
| 2005/0181273 A1 | 8/2005 | Deguchi et al. |
| 2005/0260473 A1 | 11/2005 | Wang |
| 2006/0014054 A1 | 1/2006 | Sugawara |
| 2006/0092588 A1 | 5/2006 | Realmuto et al. |
| 2006/0251957 A1 | 11/2006 | Darcy et al. |
| 2007/0072067 A1 | 3/2007 | Symons et al. |
| 2007/0080666 A1 | 4/2007 | Ritter et al. |
| 2007/0111089 A1 | 5/2007 | Swan |
| 2008/0081247 A1 | 4/2008 | Nakaishi et al. |
| 2008/0193828 A1 | 8/2008 | Sahu |
| 2009/0218984 A1 | 9/2009 | Parakulam |
| 2010/0003586 A1 | 1/2010 | Sahu |
| 2010/0090651 A1 | 4/2010 | Sahu |
| 2010/0092757 A1 | 4/2010 | Nair |
| 2010/0092807 A1 | 4/2010 | Sahu |
| 2010/0092813 A1 | 4/2010 | Sahu |
| 2010/0092843 A1 | 4/2010 | Conway |
| 2010/0094468 A1 | 4/2010 | Sahu |
| 2010/0136455 A1 | 6/2010 | Winter |
| 2010/0143781 A1 | 6/2010 | Keshavarz |
| 2011/0074357 A1 | 3/2011 | Parakulam et al. |
| 2011/0079074 A1 | 4/2011 | Sahu |
| 2011/0080143 A1* | 4/2011 | Parakulam et al. ............ 320/162 |
| 2011/0081562 A1 | 4/2011 | Parakulam et al. |
| 2011/0086247 A1 | 4/2011 | Keshavarz et al. |

FOREIGN PATENT DOCUMENTS

| | | |
|---|---|---|
| JP | 60070672 | 4/1985 |
| JP | 60115174 | 6/1985 |
| JP | 1060967 | 3/1989 |
| JP | 1320776 | 12/1989 |
| JP | 2027667 | 1/1990 |
| JP | 2027668 | 1/1990 |
| JP | 3017963 | 1/1991 |
| JP | 8007913 | 1/1996 |
| JP | 10012260 | 1/1998 |
| JP | 10208766 | 8/1998 |
| JP | 11329474 | 11/1999 |
| JP | 2000058099 | 2/2000 |
| JP | 2000200619 | 7/2000 |
| JP | 2002015762 | 1/2002 |
| JP | 2002175822 | 6/2002 |
| JP | 2002289233 | 10/2002 |
| JP | 2002367661 | 12/2002 |
| JP | 2003173812 | 6/2003 |
| JP | 2005142056 | 6/2005 |
| JP | 2005228622 | 8/2005 |
| JP | 2005228633 | 8/2005 |
| JP | 2005322447 | 11/2005 |
| JP | 2006107988 A2 | 4/2006 |
| JP | 2006114360 | 4/2006 |
| JP | 2006147306 | 6/2006 |
| JP | 2006147376 | 6/2006 |
| JP | 2006313691 | 11/2006 |
| JP | 2006351346 | 12/2006 |
| JP | 2007087829 | 4/2007 |
| WO | 8905528 | 6/1989 |
| WO | 9003666 | 4/1990 |
| WO | 03005476 | 1/2003 |
| WO | WO 03-017395 A1 | 2/2003 |
| WO | 2004079849 | 9/2004 |
| WO | 2006135958 | 12/2006 |
| WO | WO 2012/097340 A1 | 7/2012 |

OTHER PUBLICATIONS

Office Action for U.S. Appl. No. 12/217,059 mailed Aug. 23, 2010.
Search Report for PCT Application No. PCT/US2009/049285 mailed Aug. 21, 2009.
Office Action for U.S. Appl. No. 12/577,137 mailed Sep. 7, 2010.
Extended European Search Report mailed Jun. 20, 2013, in related European Application No. 10781371.9.

* cited by examiner

CONTROL SYSTEM FOR A FLOW CELL BATTERY

PRIORITY CLAIM

This application claims the benefit of U.S. Provisional Application No. 61/182,079 entitled "Control System for a Flow Cell Battery," filed on May 28, 2009 and U.S. Provisional Application No. 61/182,660 entitled "Control System for a Flow Cell Battery," filed on May 29, 2009.

BACKGROUND OF THE INVENTION

1. Field of the Invention

Embodiments disclosed herein generally relate to control systems, and more specifically, to a control system for a flow cell battery.

2. Description of the Relevant Art

There is an increasing demand for novel and innovative electric power storage systems. Redox flow cell batteries have become an attractive means for such energy storage. In particular, redox batteries can be utilized as energy backup supplies in areas where power from the grid is unreliable, for energy load shifting where energy can be stored at low demand times and supplied at peak demand times, and for storage in alternative energy systems to supply power when the alternative energy source (e.g. solar, wind, tidal, or other source) is unavailable or low in production.

In a redox flow cell battery system, for example, a battery cell may include two electrodes, each immersed in an electrolyte. The two electrolytes are separated by a membrane. The battery is discharged when current flows between the terminals and a charged ion is transported across the membrane. The electrolytes are flowed through the battery so that the amount of stored energy is not determined by the size of the cell itself. The battery is charged when a current is supplied between the terminals and the charged ion is transported back across the membrane, charging the two separated electrolytes in the cell. The electrical energy is thereby stored by appropriately charging the two electrolytes.

In order to provide a consistent supply of energy, it is important that many of the components of the flow cell battery system are performing properly. Flow cell performance, for example, can change based on parameters such as the state of charge, temperature, electrolyte level, concentration of electrolyte and fault conditions such as leaks, pump problems, and power supply failure for powering electronics. To be useful as an electric power storage system, it is desirable that the flow cell battery system requires a minimal amount of maintenance and monitoring. Therefore, there is a need for efficient control systems for controlling and monitoring a flow cell battery system.

SUMMARY OF THE INVENTION

In accordance with some embodiments, a controller for controlling a flow cell battery system is disclosed. In some embodiments, the controller includes one or more processors executing a state machine, the state machine including a shutdown state; an initialization state that is transitioned to when the flow cell battery system is turned on; a plating state transitioned to from the initialization state; a charging state transitioned to from the plating state; a float state that can be transitioned to from the charging state if charging is complete; a discharge state that can be transitioned to from the charging state or from the float state if a discharge condition is detected; and a hibernate state that can be transitioned to from the discharge state when the flow cell battery is discharged below a threshold level, and wherein the hibernate state can transition to the charge state when a charging condition is detected.

In one embodiment, in the plating state, at least a portion of the electrodes are plated with a plating metal. In the charging state at least a portion of the electrolytes in the flow cell battery are brought to a charged chemical state. In the discharge state power is supplied to a load coupled to the flow cell battery system in the discharge state.

In one embodiment, the controller switches the flow cell battery system to the charging state if the plating of the electrodes is complete. The controller further switches the flow cell battery system from the charging state to the discharge state when power to the flow cell battery system is disconnected and a load is coupled to the flow cell battery system.

The flow cell battery system may also be operated in a float state. In the float state power to electrodes of the flow cell battery system is reduced with respect to the power supplied to the electrodes during the charging state. The controller switches the flow cell battery system from the charging state to the float state when a state of charge of the flow cell battery system is greater than a predetermined charged set point and when power is supplied to the flow cell battery system. In some embodiments, the predetermined charged set point is a state of charge greater than 80%, greater than 85%, greater than 90%, greater than 95%, or greater than 99%. The controller may also switch the flow cell battery system from the float state to the discharge state when power to the flow cell battery system is disconnected and a load is coupled to the flow cell battery system.

The flow cell battery system may also be operated in a hibernation state. The controller switches the flow cell battery system from the discharge state to the hibernation state when a state of charge of the flow cell system is less than a predetermined discharged set point and when no power is being supplied to the flow cell battery system. In some embodiments, the predetermined discharged set point is a state of charge less than 20%, less than 15%, less than 10%, less than 5%, or less than 1%. The controller may also switch the flow cell battery system from a hibernation state to a charging state when power is supplied to the flow cell battery system. In some embodiments, the controller switches switch the flow cell battery system from the discharge state to the charging state when power is supplied to the flow cell battery system during the discharge state and when a state of charge of the flow cell battery system is less than a predetermined charged set point.

The flow cell battery system may also be operated in a shutdown state. The controller may switch the flow cell battery system from any state to the shutdown state when a fault is detected. The flow cell battery system may come out of the shutdown state after a predetermined amount of time, if the shutdown is due to a short circuit at the output of the flow cell battery system, or within the flow cell battery system.

The flow cell battery system may also be operated in initialization state. The controller switches the flow cell battery system to the initialization state when power is supplied to the flow cell battery system operating in the shutdown state. The controller switches the flow cell battery system to a plating state when the initialization state is complete.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
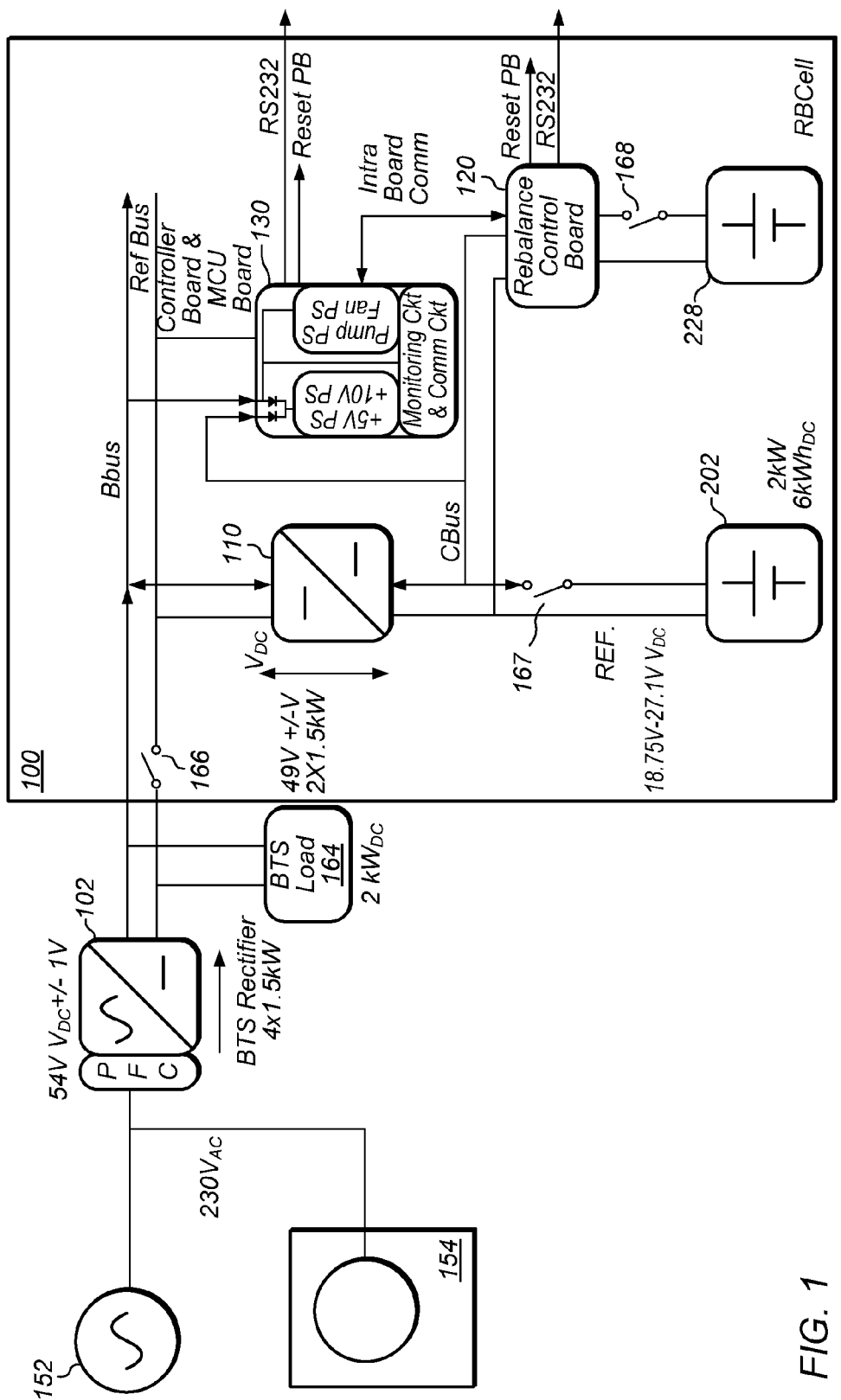
FIG. 1 illustrates a particular example of a flow cell battery system according to some embodiments.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise.

FIG. 1 illustrates a redox flow cell battery system 100 that includes a redox flow cell 202. As shown in FIG. 1, power is received from several sources, including an external power line 152 or a generator 154 (e.g., a diesel or gas powered generator). In general, external power line may supply energy from any source, including a power grid or dedicated generator such as a solar, tidal, wind, or other form of generator. AC power is received in a rectifier 102, which is coupled to provide DC power to load 164. DC power is provided to flow cell battery system 100 from rectifier 102 when AC power is supplied to rectifier 102. In the embodiment shown in FIG. 1, DC power supplied to redox flow cell battery system 100, and to load 164, is supplied between a reference bus and a Bbus.

As shown in FIG. 1, redox flow cell battery system 100 includes a redox flow cell 202 and a rebalance cell 228. Redox flow cell 202 provides or receives DC power through a CBus to a buck-boost circuit 110, when switch 167 is closed. An example of buck-boost circuit 110, is described in U.S. patent application entitled "Buck-Boost Control Circuit", filed concurrently herewith, which claims priority to U.S. Provisional Patent Application No. 61/182,082 entitled "Buck-Boost Control Circuit", filed May 28, 2009, both of which are incorporated herein by reference. During charging, buck-boost circuit 110 provides charging current from rectifier 102 to redox flow cell 202 in order to recharge redox flow cell battery system 100. During discharge, buck-boost circuit provides power across load 164 when no power is provided by rectifier 102. Power is supplied or received by buck-boost circuit 110 when switch 166 is closed.

Rebalance cell 228 is coupled to redox flow cell 202 to rebalance the electrolytes during operation. Rebalance cell 228 is controlled by a rebalance control board 120. Some embodiments of rebalance cell 228 and rebalance control board 120 are further described in U.S. patent application entitled "Flow Cell Rebalancing", filed concurrently herewith, which claims priority to U.S. Provisional Patent Application No. 61/182,099 entitled "Flow Cell Rebalancing", filed May 28, 2009, both of which are incorporated herein by reference. As shown in FIG. 1, when switch 168 is closed, power can be supplied to rebalance cell 228 by rebalance control board 120.

Electronics 130 monitors and controls operation of flow cell battery system 100. As shown in FIG. 1, electronics 130 is coupled to rebalance control board 120, and monitors the Bbus and the Cbus. Electronics 130 is also coupled to control the flow of electrolytes in redox flow cell 202. Electronics 130 gets power from either the C-Bus or B-Bus, as shown in FIG. 1, to ensure that power is maintained to the control electronics.

Figure 2:
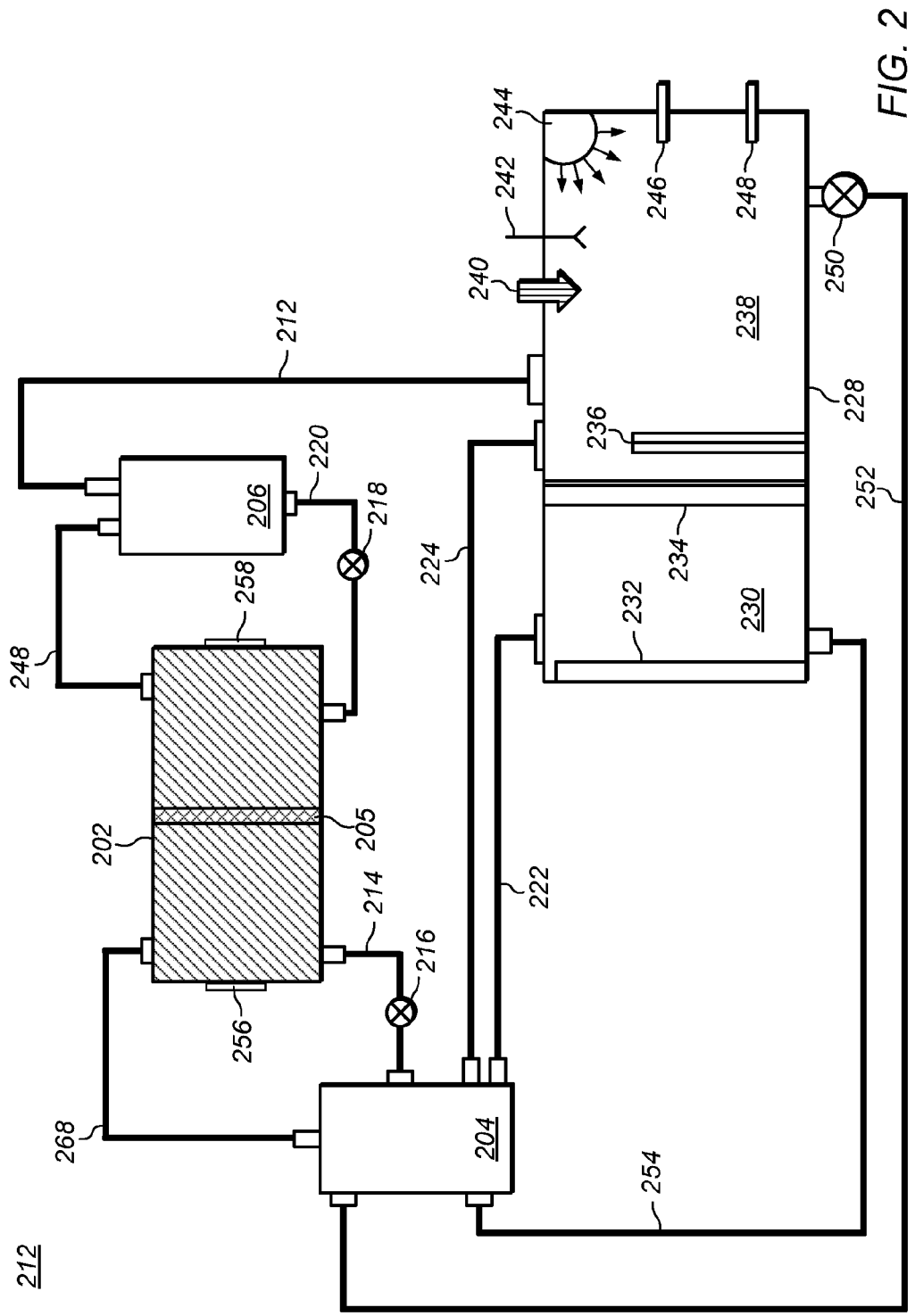
FIG. 2 illustrates a flow cell battery coupled to a control system according to some embodiments.

FIG. 2 illustrates a redox flow cell battery 212 that includes redox flow cell 202 and rebalance cell 228. Redox flow cell battery includes one or more redox flow cells 202, each cell having a cathode side and an anode side separated by a membrane 205. The ends of the cells are defined by electrodes 256 and 258. In redox flow cell battery 212, electrode 256 is the anode battery terminal and electrode 258 is the cathode battery terminal. Electrolyte for the anode is stored in tank 204, electrolyte for the cathode is stored in tank 206, and flowed through redox flow cell 202. Energy, therefore, is converted between chemical energy stored in the electrolytes and electricity of redox flow cell 202. Therefore, the charge on redox flow cell battery 212 is limited only by the storage capacity of tanks 204 and 206. The operation of flow cell stack and the composition of a membrane is further described in U.S. patent application Ser. No. 12/217,059, entitled "Redox Flow Cell," filed on Jul. 1, 2008, which is incorporated herein by reference. Construction of a flow cell stack is described in U.S. patent application Ser. No. 12/577,134, entitled "Common Module Stack Component Design" filed on Oct. 9, 2009, which is incorporated herein by reference. Tanks 204 and 206 may include fluid level sensors to determine the level of fluid in the tanks Example of fluid level sensors are described in U.S. patent application Ser. No. 12/577,147, entitled "Level Sensor for Conductive Liquids" filed on Oct. 9, 2009, which is incorporated herein by reference. Examples of electrodes 256 and 258 are described in U.S. patent application Ser. No. 12/576,235, entitled "Magnetic Current Collector" filed on Oct. 8, 2009, which is incorporated herein by reference.

As shown in FIG. 2, electrolyte from tank 206 can be pumped by pump 218 through pipe 220 into redox flow cell 202 and returned through pipe 248 to tank 206. Further, electrolyte from tank 204 can be pumped by pump 216 through pipe 214 into redox flow cell 202 and returned to tank 204 through pipe 268. In some embodiments, pumps 216 and 218 may be located inside tanks 204 and 206, respectively.

In some embodiments, during operation of flow cell stack 202 hydrogen gas is produced and electrolytes in each half-cell of redox flow cell 202 become unbalanced. Rebalance cell 228 functions to rebalance electrolytes. As shown in FIG. 2, rebalance cell 228 includes electrodes 232 and 236 separated by membrane 234. Electrolyte can be transferred through pipe 222 into compartment 230 and returned through pipe 254 to tank 204. Further, compartment 238 may be partially filed with electrolyte transferred through pipe 224 from tank 204. Further, compartment 238 may be drained into tank 204 through pipe 252 when valve 250 is open. Valve 250 may be a pump as well in order to move fluid from compartment 238 into tank 204.

As shown in FIG. 2, the level of electrolyte 208 in compartment 238 can be controlled utilizing lower level sensor 248 and upper level sensor 246. Because there is a loss of electrolyte during the rebalance process in compartment 238, when the level of fluid reaches lower level sensor 248, fluid from tank 204 may be used to refill compartment 238 until fluid reaches upper level sensor 246. After some number of refills, electrolyte in compartment 238 may need to be completely replaced. In which case, when the electrolyte level in compartment 238 reaches lower level sensor 248 valve, 250 may be opened to allow the fluid to drain into tank 204, or be pumped back into tank 204, and then compartment 238 is refilled from tank 204. In some embodiments, electrolyte may be allowed to flow through compartment 238 for a set period of time in order to flush fluid out of compartment 238 before refilling with fresh electrolyte.

As shown in FIG. 2, hydrogen gas may be flowed into compartment 238 from tank 206 through pipe 212. When power is applied between electrodes 232 and 236, and compartment 238 is partially filed with electrolyte 208, chlorine gas is produced so that a mixture of chlorine gas and hydrogen gas accumulates above the fluid level in compartment 238. UV light source 244 is mounted in the gas area of compartment 238. Light from UV light source 244 facilitates the formation of HCl from the hydrogen and chlorine gas, which is absorbed into the fluid of electrolyte 208 in compartment 238. Hydrogen ions can pass through membrane 234 to interact with the constituents of electrolyte 238 being flowed through compartment 230.

Both hydrogen gas and chlorine gas are problematic in concentration, especially in the presence of UV radiation. In order to monitor the process, and ultimately to control the process, sensors 240 and 242 are provided in compartment 238. Sensor 240 may include temperature and pressure sensors. If, for example, the temperature or pressure exceed a set threshold value, certain steps such as shutting down redox flow cell battery 212 may be taken. Sensor 242 measures the relative concentrations of chlorine and hydrogen gas. The ratio of chlorine concentration to hydrogen concentration may be kept at a particular level, for example between one and two, in order to safely control the formation of HCl. Some embodiments of sensor 242 are further described in U.S. patent application entitled "Hydrogen Chloride Level Detector", filed concurrently herewith, which claims priority to U.S. Provisional Patent Application No. 61/182,076 entitled "Hydrogen Chloride Level Detector", filed May 28, 2009, both of which are incorporated herein by reference.

Figure 3:
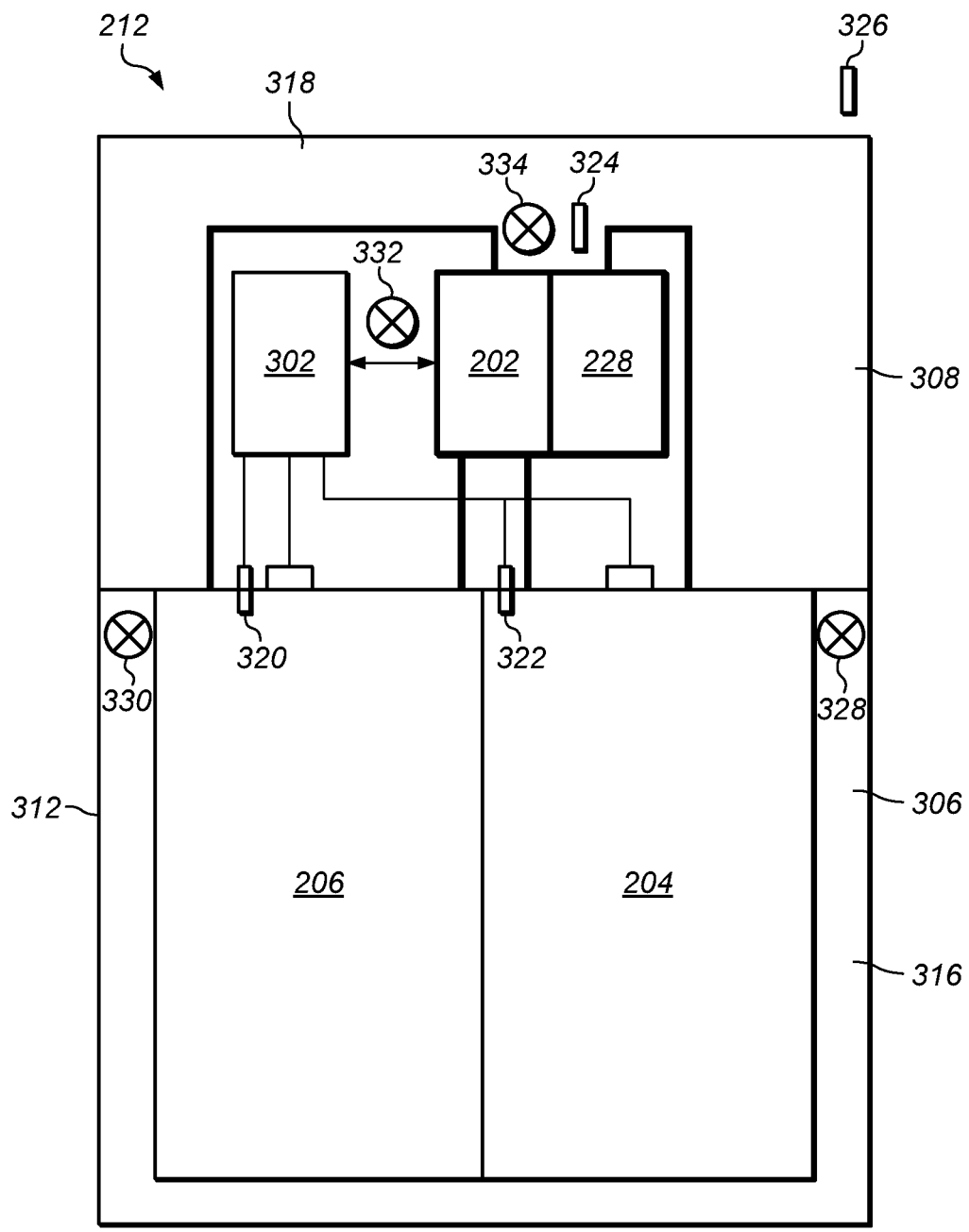
FIG. 3 illustrates a cabinet that houses the flow cell battery along with temperature control systems that are coupled to a control system according to some embodiments.

FIG. 3 illustrates an enclosure 312 that houses redox flow cell 212. As shown in FIG. 3, enclosure 312 includes a lower section 306 and an upper section 308. Lower section 306 houses holding tanks 206 and 204. Upper section 308 houses flow cell stack 202, rebalance cell 228, control electronics 302, and all other wiring, plumbing, valves, pumps, and other components of redox flow cell battery 212. Redox flow cell battery 212 may be of any size, so enclosure 312 can be of any dimensions or shape capable of housing redox flow cell battery 212.

A redox flow cell battery efficiently operates within a range of temperatures, for example between about 30° C. and about 50° C. However, the redox flow cell battery may be in thermal environmental conditions that vary widely over time. For example, the redox flow cell battery may be placed in a sunny location in a hot environment, or in the shade in a cold environment. Nonetheless, the temperature of the electrolyte in holding tanks 206 and 204 and the temperature of the electronics 302, redox flow cell 202, and rebalance cell 228 should be maintained within the efficient operating range of redox flow cell battery 212. Thermal management of redox flow cell battery 212 is disclosed in U.S. patent application Ser. No. 12/577,127, entitled "Thermal Control of a Flow Cell Battery" filed on Oct. 9, 2009, which is incorporated herein by reference.

Enclosure 312 can be part of the thermal management of redox flow cell battery 212. As shown in FIG. 3, a fluid blanket 316 is created about holding tanks 206 and 204 in lower section 306. Further, a fluid blanket 318 exists about flow cell stack 202, electronics 302, and rebalance cell 228 in upper portion 308. Fluid blanket 316 and fluid blanket 318 may be air blankets, which are utilized to thermally control the temperatures. In some embodiments, however, fluid blanket 316 or fluid blank 318 may be water, oil, or other fluid that can be utilized to thermally regulate the interior of enclosure 312.

Temperature sensors 320 and 322 can be utilized to monitor the temperature of electrolyte in tanks 206 and 204. A temperature sensor 324 can be utilized to monitor the temperature of upper portion 308. Further, a temperature sensor 326 can be utilized to monitor ambient temperature. Control electronics 302, receiving temperature readings from temperature sensors 320, 322, 324, and 326, can then control fans, blowers, or fluid pumps and heaters in order to control the operating temperature of battery 112. For example, in FIG. 3 blowers 330 and 328 can control air flow in blanket 316. Fans 332 and 334 can control the air flow of blanket 318.

Figure 4:
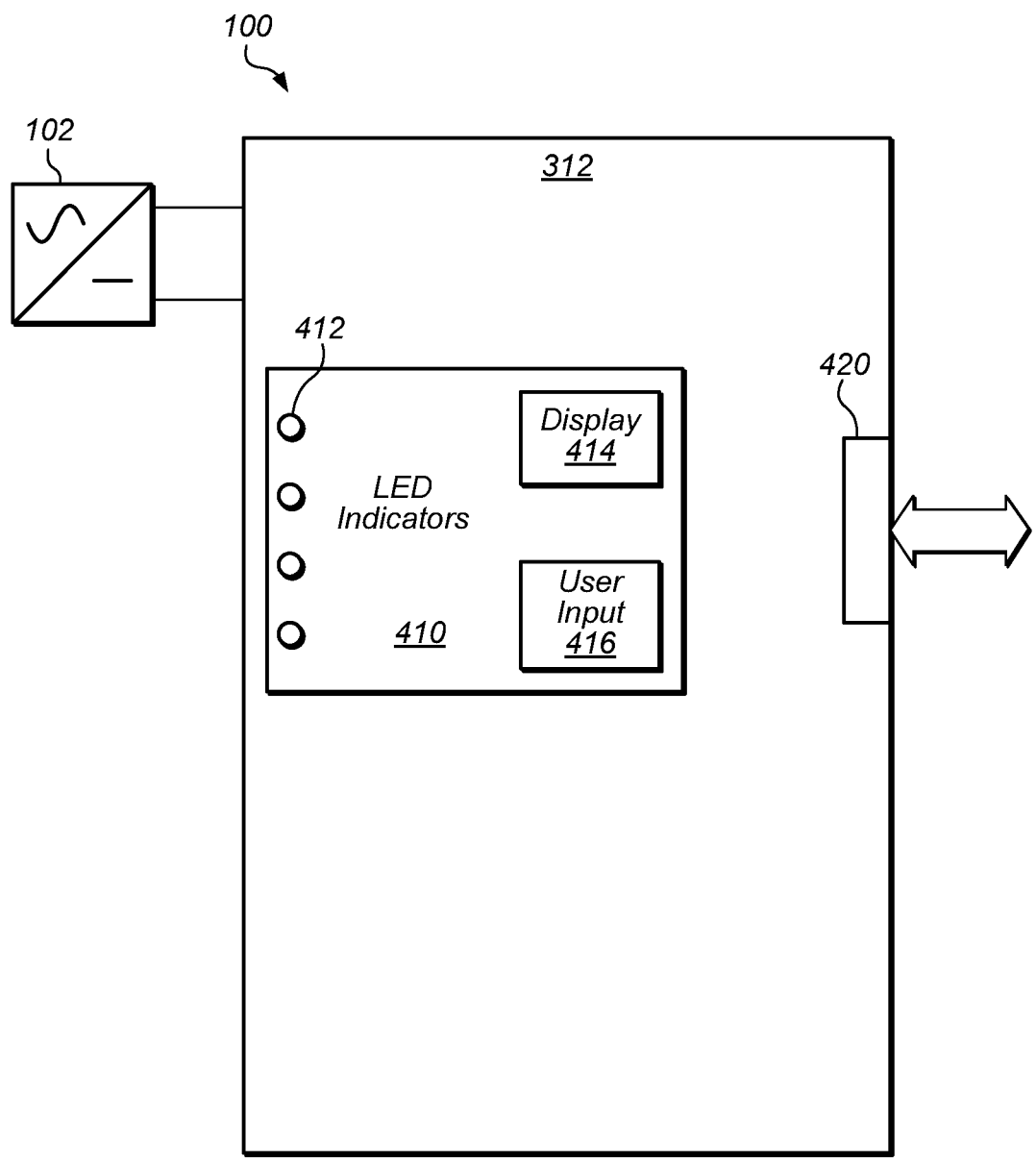
FIG. 4 illustrates an example external environment for a flow cell battery system according to some embodiments.

FIG. 4 illustrates example inputs and outputs to some embodiments of redox flow cell battery system 100 disposed in an enclosure 312. As shown in FIG. 4, DC power is received by flow cell battery system 100 from rectifier 102. A user display panel 410 can include indicators 412 and a digital display 414 for communicating the status of redox flow cell battery system 100 to a user. Additionally, a user display panel 416 may include an input panel 416 to receive input commands from a user. Such input commands can include a power-up command, shut-down command, and various requests for information, the results of which may be displayed on indicators 412 or display 414. An interface 420 may be provided to communicate with flow cell battery system 100 with an external device. Interface 420 may also be coupled to allow flow cell battery system 100 to communicate over the internet, or phone, either wired or wirelessly, with monitoring and control systems separated from flow cell battery system 100.

Figure 5:
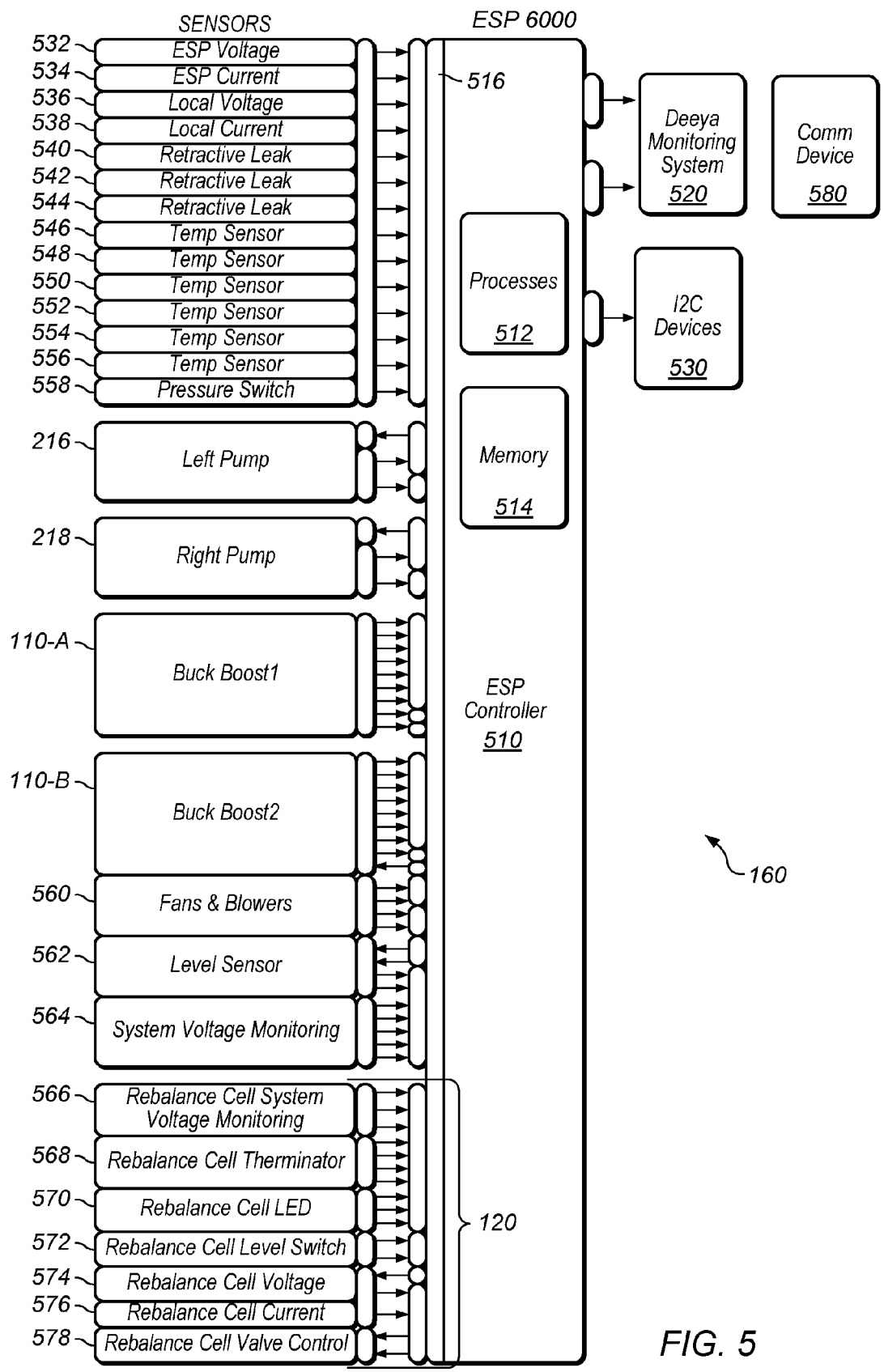
FIG. 5 illustrates a controller system according to some embodiments.

FIG. 5 shows an embodiment of electronics 160. Electronics 160 includes the control systems that control all aspects of system 100. As shown in FIG. 5, electronics 160 includes a system controller 510. System controller 510 includes one or more processors 512, volatile and non-volatile memory 514, and signal processors 516 that receives and processes various input signals and drives output signals.

As shown in FIG. 5, controller 510 receives the voltage and current on the Bbus in sensors 532 and 534, respectively.

Additionally, the voltage and current of flow to or from cell stack 202 is provided in sensors 536 and 538, respectively. Leaks detector inputs 540, 542, and 544 provide information regarding fluid leaks in redox flow cell battery system 100. Embodiments of leak detectors that, for example, can distinguish electrolyte leaks are further described in U.S. patent application entitled "Optical Leak Detection Sensor", filed concurrently herewith, which claims priority to U.S. Provisional Patent Application No. 61/182,077 entitled "Optical Leak Detection Sensor", filed May 28, 2009, both of which are incorporated herein by reference. Leak sensors may be placed in various portions of cabinet 312, and may be provided in pumps 216 and 218. Controller 510 also receives signals from temperature sensors 546, 548, 550, 552, 554, 556, and 558, for example, which are temperature sensors at various locations throughout the system. Further, signals may be received from pressure sensor 558.

Signals are also received from electrolyte pumps 216 and 218. For example, as shown in FIG. 5, the rpm of each pump and the current drawn from each pump is received. Controller 510 provides a signal to each pump to control the rpm, which in turn controls how fast electrolyte is pumped.

Controller 510 also receives and provides signals to various fans and blowers 560 in order to provide thermal control of flow cell battery system 100. Use of temperature sensors 546 through 556 and fans and blowers 560 in order to thermally manage flow cell battery system 100 is further disclosed in U.S. patent application Ser. No. 12/577,127, entitled "Thermal Control of a Flow Cell Battery" filed on Oct. 9, 2009, which is incorporated herein by reference.

Level sensor 562 provides information regarding the level of electrolyte and the condition of electrolyte stored in tanks 204 and 206. Embodiments of level sensors that can be utilized for level sensors 562 are described in U.S. patent application Ser. No. 12/577,147, entitled "Level Sensor for Conductive Liquids" filed on Oct. 9, 2009, which is incorporated herein by reference.

System voltage monitoring 564 provides controller 510 with signals related to the voltages supplied to control circuitry. These voltages include, for example, the 5V, 10V, 15V, and 3.3V supplies.

In some embodiments, controller 510 can monitor rebalance cell 228. In which case, controller 510 receives signals from the rebalance cell system voltage monitors 566, the rebalance cell thermisters 568 in sensors 240, which monitor temperature at various locations in rebalance cell 228, the rebalance cell LED 570, rebalance cell level switches 572, rebalance cell voltage supplied across electrodes 232 and 236 (574), rebalance cell current between electrodes 232 and 236 (576), and provides controls for rebalance cell valves 226 and 250 (578). Rebalance cell 228, and rebalance control board 120, are further disclosed in U.S. patent application entitled "Flow Cell Rebalancing", filed concurrently herewith, which claims priority to U.S. Provisional Patent Application No. 61/182,099 entitled "Flow Cell Rebalancing", filed May 28, 2009, both of which are incorporated herein by reference.

In some embodiments, controller 510 can communicate to devices through a device interface 530, which may be an I2C interface. For example, controller 510 may communicate with rebalance control board 120 and buck-boost 110 through the I2C interface. Further, controller 510 may communicate with a global monitoring system 520 through a communication device 580, which may be wireless or may be directly coupled to a network.

Figure 6:
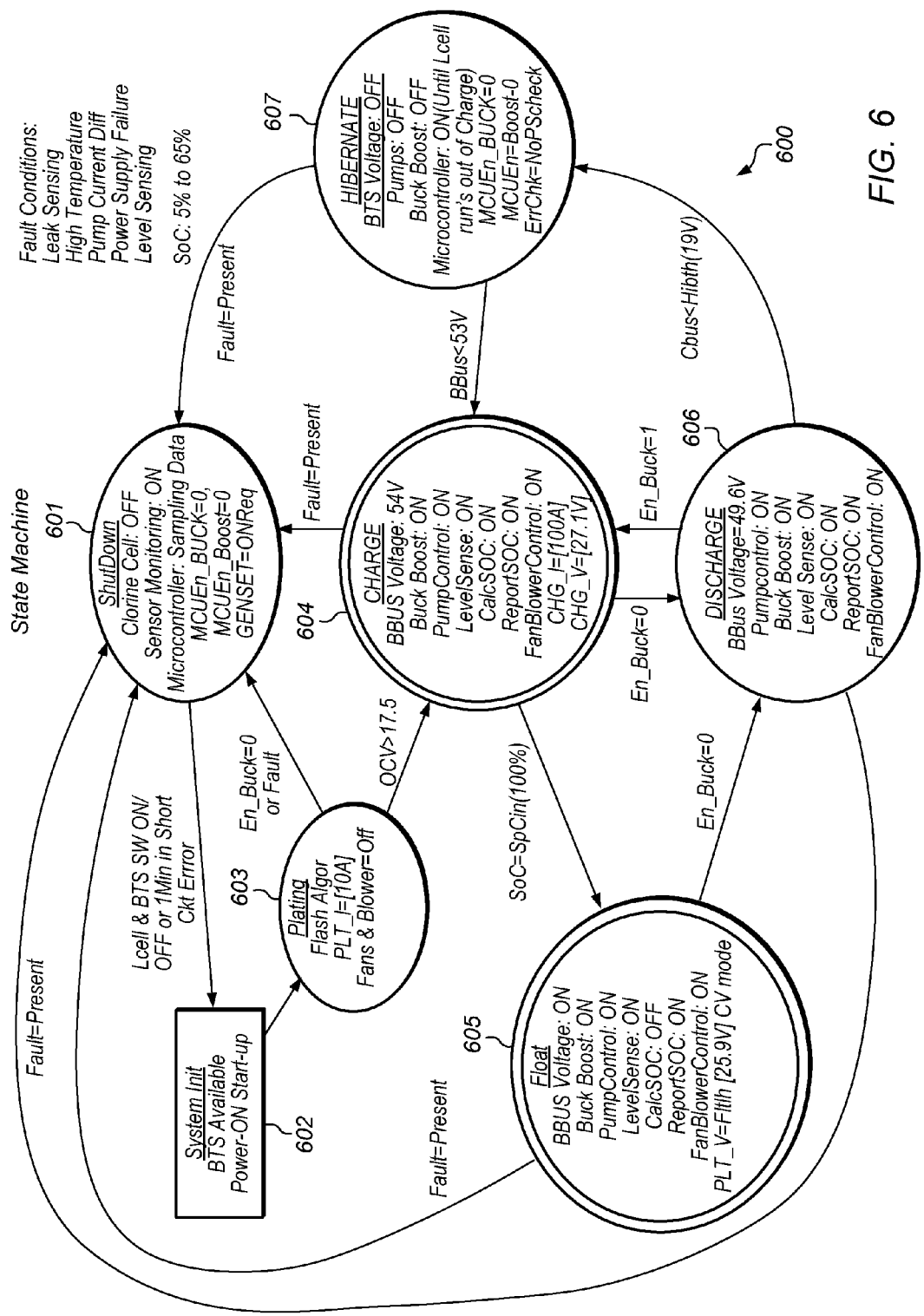
FIG. 6 illustrates a state function map for operation by a controller system.

FIG. 6 illustrates a state diagram that can be executed on controller 510 for operation of flow cell battery system 100. As shown in FIG. 6, state machine 600 starts in initialization state 602. Controller 510 transitions to a system initialization state 602 when a main switch, switch 166, is turned on or after a predetermined period of time has passed after a short condition is experienced. In some embodiments, switch 168 is closed along with switch 166. In initialization state 602, load 164 is available and flow cell battery system 100 is powered on. Further, software parameters are initialized. Once initialization step 602 is complete, controller 510 transitions to plating step 603.

During plating state 603, power is applied across electrodes 256 and 258 of flow stack 202 (shown in FIG. 2) in order to provide plating of the electrodes using a plating metal added to the electrolytes for the electrodes in flow stack 202 (e.g., bismuth metal). In some embodiments, a small current at a nominal voltage is provided across electrodes 256 and 258. When the current drops below a current threshold value or the voltage increases above a voltage threshold value, plating is completed. For example, in some embodiments the plating voltage is set at 18.5 V with a current of 8 amps. Plating is completed if the current crops below 4 amps or the voltage increases about 18.5 volts. Once plating is completed, controller 510 transitions to charging state 604.

In some embodiments, especially when a new flow cell battery 112 is placed in service, a small amount of plating metal is added to electrolytes 208 and 210 and is plated onto the electrodes of flow cell stack 202 during plating state 603. When flow cell stack 202 has been plated, in some embodiments plating state 603 can be bypassed. In some embodiments, plating state 603 operates on each transition from initialization state 602. Plating is done at low voltage and low current. In order that plating state 603 completes, even with systems that have already been plated, controller 510 is capable of detecting completion in order to transition to charging state 604.

Several states of state machine 600 transition to shutdown state 601 upon detection of a fault. Fault conditions include, for example, detection of a leak, detection of a high temperature situation, detection of a pump problem, detection of a power supply failure for powering electronics, and detection of a low electrolyte level. Other fault conditions may also be detected. Controller 510 transitions from plating state 603 to shutdown state 601 upon detection of a fault or if a buck state in buck-boost 110 is not enabled. In shutdown state 601, all pumps are off and all buck-boosts are off. Sensor monitoring is on and controller 510 may be sampling data. Further, a genset request may be on. Essentially, flow cell battery system 100 is off. Switches 166 as shown in FIG. 1, may be open, isolating flow cell battery system 100 from load 164, as shown in FIG. 1.

If shutdown state 601 was transitioned to due to the presence of a short at the load or at the Bbus, controller 510 is configured to transition the system to the initialization state after a predetermined time. This sequence is guided by a short circuit latch release algorithm. The Power good signal from the Buck boost board is tied to the interrupt line INT1 When the interrupt occurs the system should generate a Bbuss fault and should go into shutdown state Initially INT1 should be configured to trigger on the falling edge. When the interrupt occurs this signifies that there is a short on the Bbus. This error is reported. Interrupt routines set a flag to shutdown the system. The interrupt should be reconfigured to get an interrupt on the rising edge. When the interrupt occurs on the rising edge reset the error code. Send a 200 msec wide latch release signal and restart the state machine from the Initial state. Blank the Error checking for the next 1 sec.

As suggested, during charging state 604 flow cell battery 112 is charged. Generally, charging involves supplying a current between terminals 256 and 258 while flowing electrolytes through flow cell stack 202 in order to restore the charged chemical state of electrolytes 208 and 210. Charging electrolytes 208 and 210 is generally discussed in U.S. application Ser. No. 12/074,110, filed on Feb. 28, 2008, which is incorporated herein by reference.

During charge state 604, power is supplied from either generator 154 or power source 152 through rectifier 102. In some embodiments, voltage on the Bbus when rectifier 102 is active can be about 54 V. Buck-boost circuit 110 is on in buck mode and provides power to C-bus, which is utilized to charge flow cell stack 202. Pump controls are active to control pumps 216 and 218, the level sensors are active to monitor electrolyte levels in tanks 206 and 204, state-of-charge monitoring is active, and thermal control is on.

Figure 12:
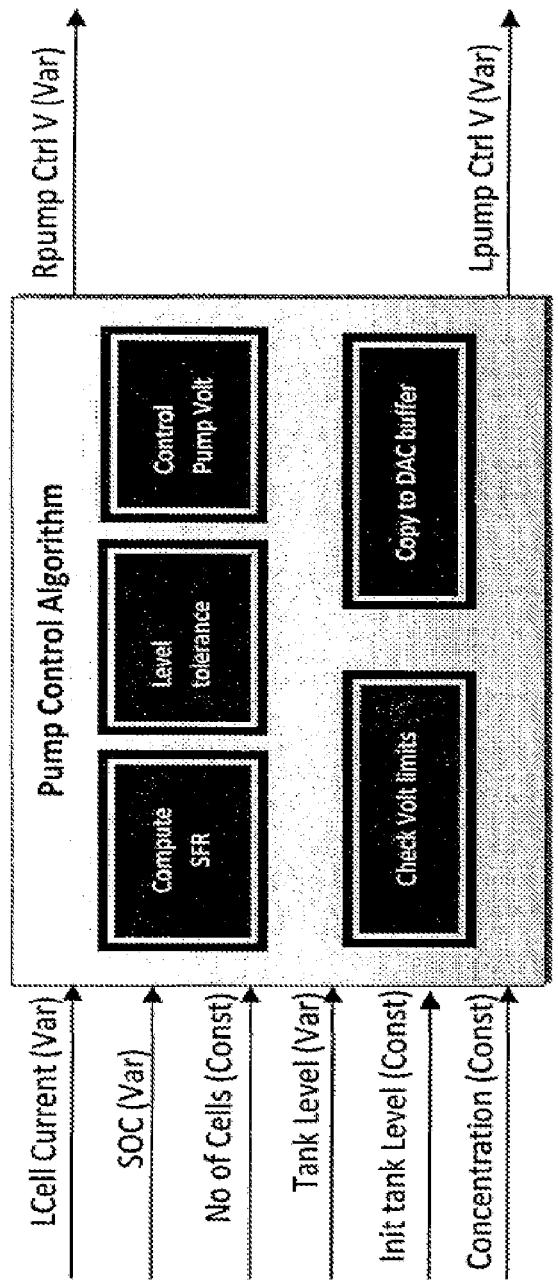
FIG. 12 depicts a schematic of a pump control algorithm.

FIG. 12 depicts a pumping control algorithm.

1. Stoichiometric Flow Rate ("SFR") Based Control Voltage Calculation a. In DISCHARGING, $SFR=3*(I*NumCells)/(C*SOC*1608)$ b. In CHARGING, $SFR=3*(I*NumCells)/(C*(1-SOC)*1608)$ where C is concentration of electrolyte.

2. Compensation for Tank Level Difference a. Compute level tolerance=$ABS(L1-L2)/2*H$ L1 and L2 level of electrolyte form the bottom of the tank, where L1 is the right side of the tank, L2 is the left side of the tank, and H is the total height of the tank.

b. Compute compensation voltage($V$delta) =$PUMP\_GAIN*tolerance*tolerance*V$min.

3. Compute Pump Control Voltage $PumpVf=Vmin$ $PumpVc=Vmin+Vdelta$

Figure 13:
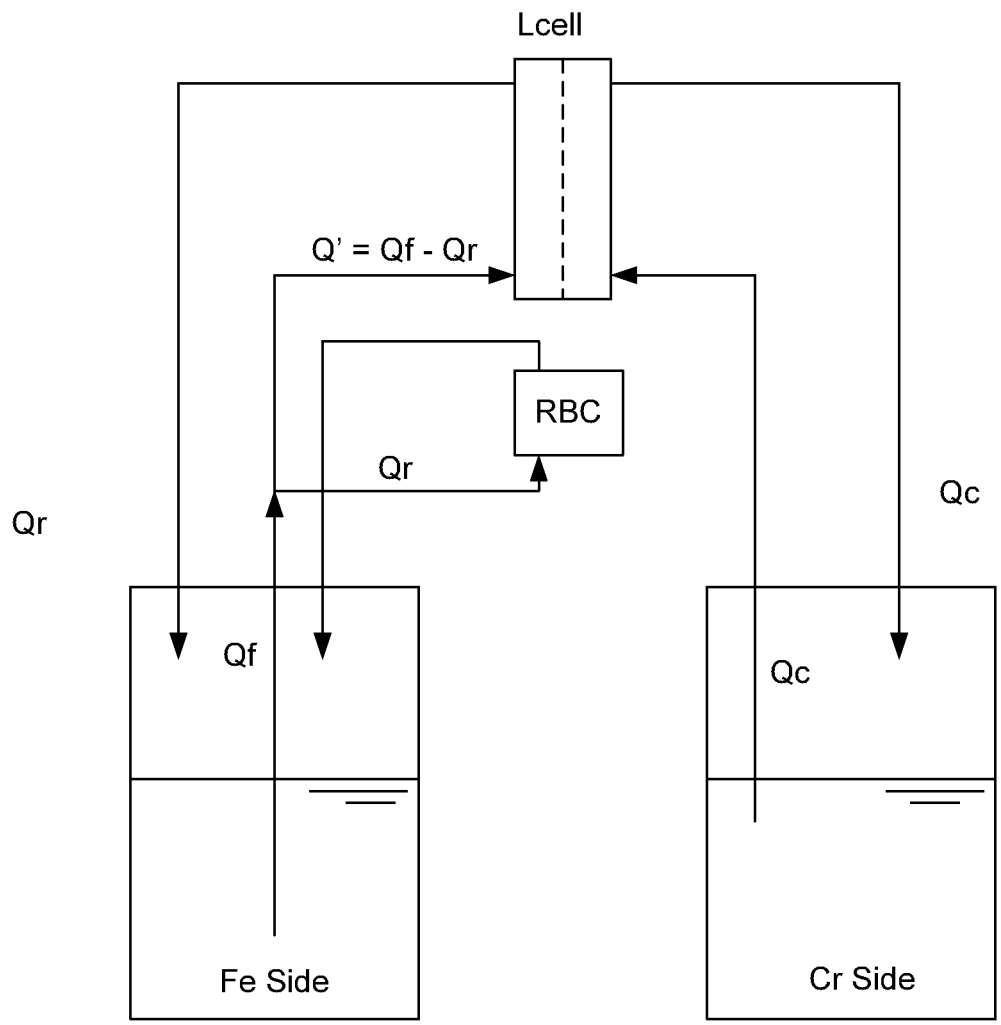
FIG. 13 depicts a pump control correction scheme for a rebalance cell.

An algorithm for computing the pump control correction for the rebalance flow cell is set forth below with reference to FIG. 13. In the following equations: Qf is the flow rate through the Fe side of the redox flow cell; Qc is the flow rate through the Cr side of the redox flow cell; Qr is the flow through the rebalance cell; Vf is the pump control voltage for the pump on the Fe side of the redox flow cell; Vc is the pump control voltage for the pump on the Cr side of the redox flow cell; Pf is the pressure of the Fe side of the redox flow cell; Pc is the pressure of the Cr side of the redox flow cell and k, a, f3 are constants. Correction control may be determined as follows If $Qf=k*Vf$, $Qc=k*Vc$ and $Qr=\alpha*Vf$ $Q'=Qf-Qr$ $Q'=(k-\alpha)*Vf$ If $Pf=\beta*Q'$ and $Pc=\beta*Qc$ $Pf=\beta*(k-\alpha)*Vf$ $Pc=\beta*k*Vc$ If Pf=Pc $\beta*(k-\alpha)*Vf=\beta*k*Vc$ $Vf=k/(k-\alpha)*Vc$ Thus, If Qc is 1.5 L/min and Qr is 1.5 L/min, the base voltage to start pump control is:

$Vf=1.1 Vc$

Further, the state of charge ("SOC") of electrolytes 208 and 210 are monitored and reported during the charging process. Descriptions of measurements of the state of charge are provided in U.S. patent application Ser. No. 11/674,101, filed on Feb. 12, 2007, which is herein incorporated by reference. During charging, thermal monitoring and control is accomplished, for example as U.S. patent application Ser. No. 12/577,127, entitled "Thermal Control of a Flow Cell Battery" filed on Oct. 9, 2009, which is incorporated herein by reference.

In some embodiments, a particular voltage and current are applied across electrodes 256 and 258 in order to charge electrolytes 208 and 210. Applying power to electrodes 256 and 258 while electrolytes flow through the flow cell battery brings at least a portion of the electrolytes from a discharged chemical state to a charged chemical state. In some embodiments, charging may stop at a predetermined charged set point. For example, charging may be stopped when the SOC reaches substantially 100%. In other embodiments, the predetermined charged set point is reached when an SOC is greater than 80%, greater than 85%, greater than 90%, greater than 95%, or greater than 99%. If, at that time, power from power source 152 is still available, controller 510 transitions to a float state 605. In some embodiments, for example, charging may occur at a voltage across electrodes 256 and 258 of about 30 volts and a current through flow cell stack 202 of about 100 amps, although more complicated charging algorithms can be employed by controller 510.

Figure 11:
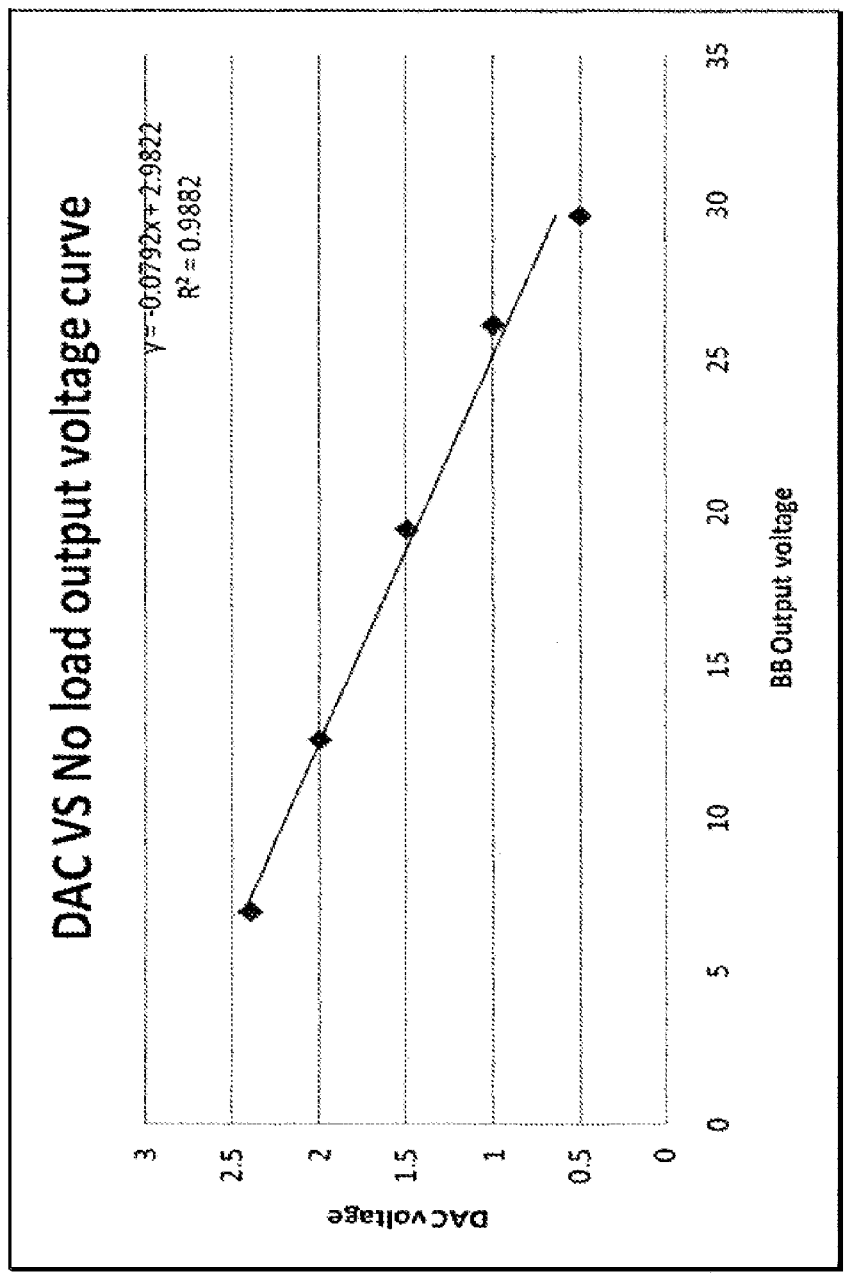
FIG. 11 depicts DAC vs.no load output voltage curve.

An alternate charging algorithm is designed to reach the target charged current quickly. The algorithm includes:

1. Read the Cbus voltage (Vcell).
2. If the ESR Value of the Cell is know use it, otherwise assume a nominal value of 27 mOhms.
3. The Vcharge=Vcell+Icharge*ESR. In the above equation Icharge is the charge current required.
4. From the calibration curves for each of the units use the equation for the DAC voltage VS. Vcharge. (Sample curve and equation is depicted in FIG. 11, DACvalue=−0.0792x+2.9822. x is the desired Vcharge voltage.
5. Apply the DAC voltage and wait for the system to settle.

If a fault is detected during the charge process that occurs in charge state 604, controller 510 transitions to shutdown state 601 to shut system 100 down. Otherwise, once a SOC of about 100% is achieved, controller 510 transitions to float state 605 if buck is still enabled. Controller 510 transitions from charge state 604 to discharge state 606 if buck-boost 110 switches from buck to boost, indicating that power is no longer being received from rectifier 102.

During float state 605, buck is enabled and provides an output voltage at a particular value. In some embodiments, the value is about 25 Volts. During this state, flow cell battery 112 is standing by and ready to provide power to load 164 should power at rectifier 102 be reduced. During the float state, pump control is on and pumps 216 and 218 may be run to provide a small flow of electrolyte through flow cell stack 202. Further, in some embodiments, power utilized for providing voltage on buck-boost 110 and for running pumps and other system may be supplied by charging rectifier 102 instead of drawing on the charged electrolyte of battery 112. Further, monitoring of the SOC can be turned off. Again, if a fault is detected, controller 510 transitions to shut down state 601.

If power to rectifier 102 fails, then controller 510 transitions from float state 605 to discharge state 606. Controller 510 can also transition from charge state 604 to discharge state 606 before SOC is about 100% if the signal En_Buck indicates that power to rectifier 102 has been interrupted. In discharge state 606, power from flow cell battery 112 is supplied to load 164. In that case, pumps 216 and 218 are activated and controlled, buck boost 110 is in boost mode, electrolyte levels in tanks 208 and 210 are monitored, and the SOC is monitored and reported. In some embodiments, the Bbus voltage can be held at about 50 V. Once the SOC drops below a certain value, for example 10%, or available power on the Cbus drops, for example below about 20 V, which indicates that flow cell battery 112 is in a substantially discharged state, then controller 510 can transition from discharge state 606 to a hibernation state 607. If, during discharge, a fault is detected, then controller 510 can transition from discharge state 606 to shutdown state 601. Further, if power, for example from power source 152 or from generator 154, is supplied to rectifier 102 then controller 510 can transition from discharge state 606 back to charge state 604, buck-boost 110 switches from boost mode to buck mode, so that flow cell battery 112 can be recharged.

Controller 510 transitions into hibernate state 607 from discharge state 606 when flow cell battery 112 is reaches a predetermined discharged set point. For example, flow cell battery may be transitioned to a hibernation state when the SOC is less than 10%. In other embodiments, the predetermined discharged set point is reached when an SOC is less than 20%, less than 15%, less than 10%, less than 5%, or less than 2%. In hibernate state 607, pumps 216 and 218 are off and buck boost 110 is turned off. Controller 510 monitors flow cell battery system 100 until the charge on flow cell stack 202 is depleted. Controller 510 can transitioned out of hibernate state 607 if power returns to rectifier 102, in which case controller 510 transitions to charge state 604 to recharge flow cell battery 112. Controller 510 can also transition from hibernate state 607 to shutdown state 701 if a fault condition is detected.

Controller 510 can transition from hibernate state 607 to charge state 604 if power appears on the Bbus. In some embodiments, generator 154 may be activated in discharge state 606 if SOC is reduced below a threshold level. In some embodiments, generator 154 may be activated in hibernate state 607. In some embodiments, controller can transition the system from the hibernation state to the plating state (not shown).

In handling any fault state that occurs throughout state machine 700, the first fault can be latched for later review and state machine 600 transitions to shutdown state 601. In some cases, multiple cascading fault conditions result from the initial fault condition, so capturing the first fault condition can help a servicer to determine what caused the system to go to shutdown mode.

Figure 7:
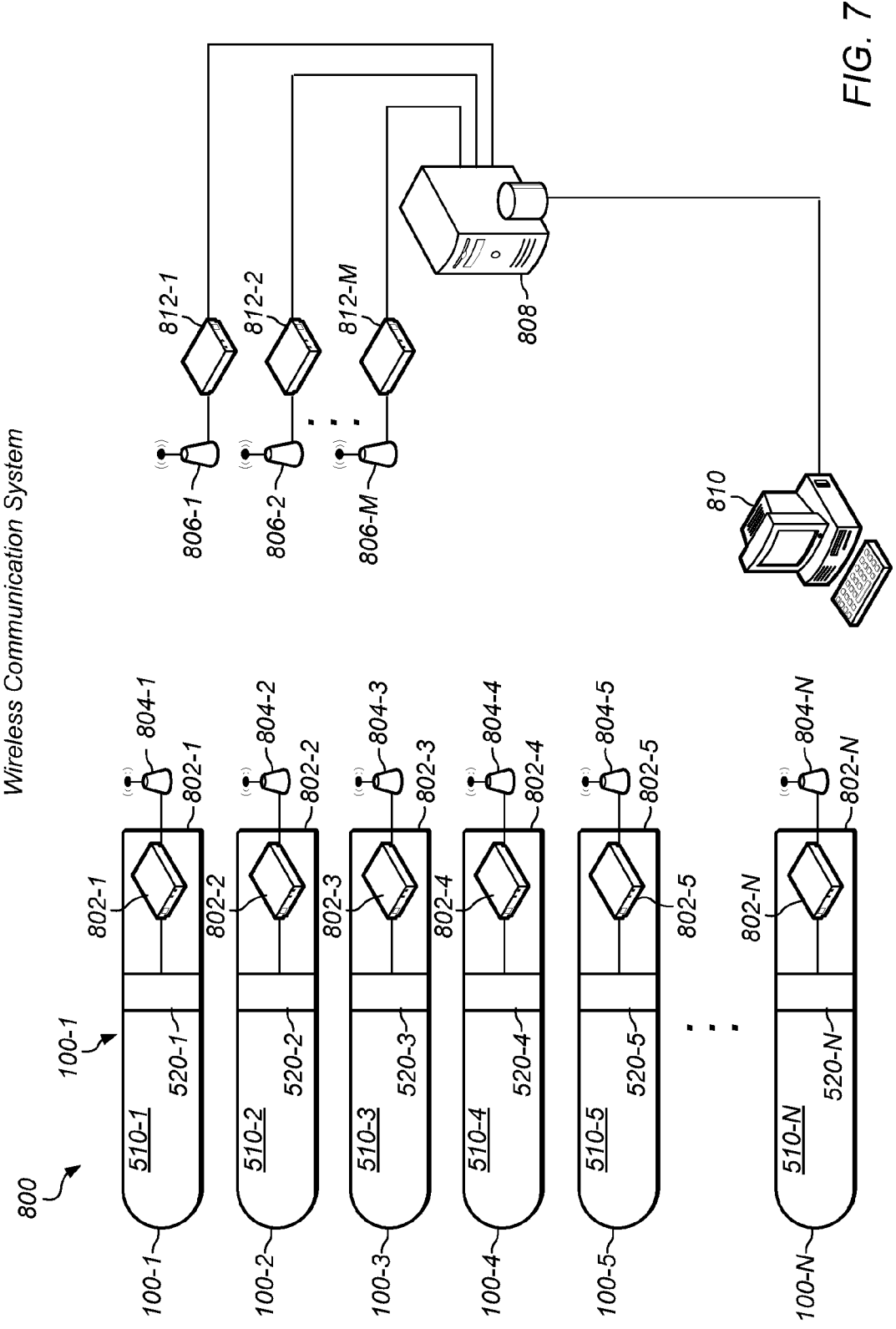
FIGS. 7 and 8 illustrate a communication system that can be utilized with a flow cell battery system.

As shown in FIG. 5, controller 510 is coupled to communication device 520. FIG. 7 illustrates a networking environment 800 for flow cell battery systems 100. As shown in FIG. 7, any number of flow cell battery systems 100, systems 100-1 through 100-N are shown, can be networked to a server 808. As illustrated in FIG. 5, each system 100-1 through 100-N includes a corresponding communication device 520-1 through 520-N, coupled to a corresponding controller 510-1 through 510-N. In some embodiments, communications devices 520-1 through 520-N can be coupled to communication devices 802-1 through 802-N, respectively. Communication devices 802-1 through 802-N can be coupled to transmit and receive data with a server 808. FIG. 7 shows communication devices 802-1 through 802-N coupled to wireless transceivers 804-1 through 804-N, but any networking connection may be utilized. For example, transceivers 804-1 through 804-N may be wired connections, internet connections, or any other connection for transmitting data.

Data is received by a server 808 coupled through communication devices 812-1 through 812-N and transceivers 806-1 through 806-N, respectively. Server 808 can receive data from systems 100-1 through 100-N and can transmit data and instructions to systems 100-1 through 100-N. A computer 810 coupled to server 808 can provide a user interface, through which individual ones of systems 100-1 through 100-N can be monitored and controlled.

Figure 8:
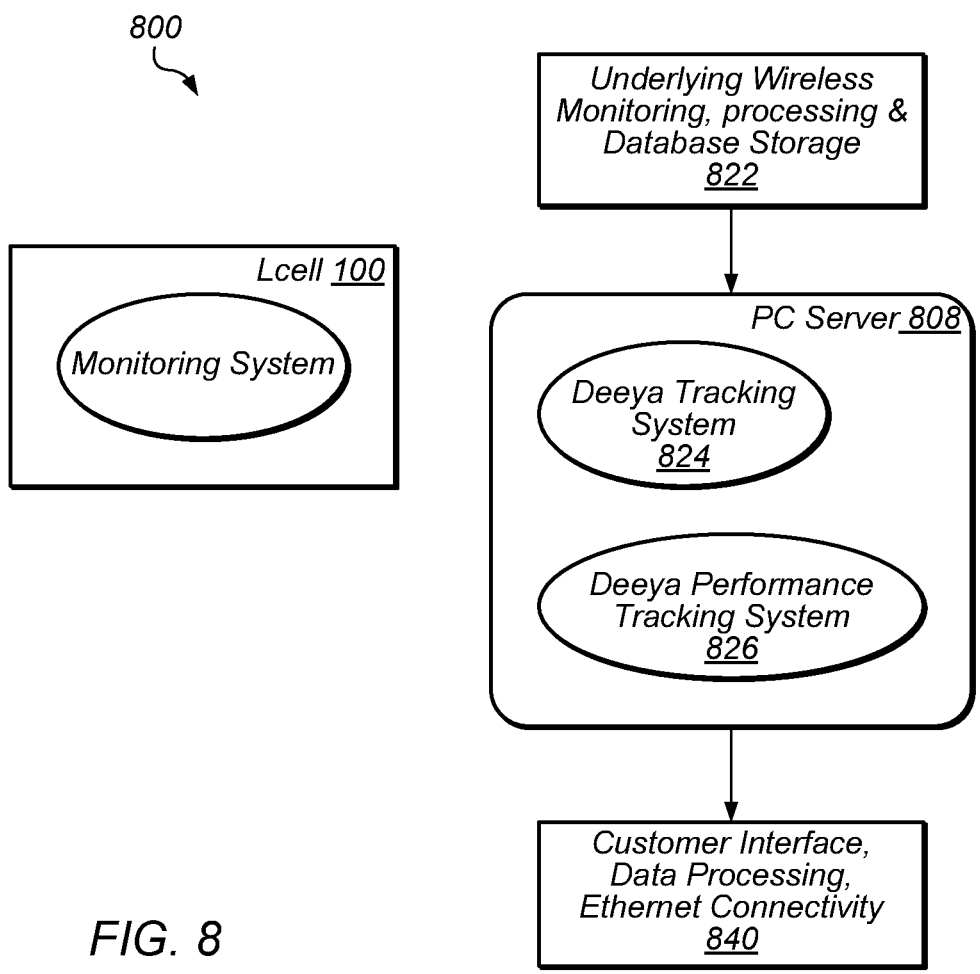

FIG. 8 further illustrates system 800. As shown in FIG. 8, system 100 includes control electronics, which includes a controller and communications device. As discussed above, the controller monitors various aspects of system 100, and especially the flow cell battery, and provides operating information, including fault information, for transmission to server 808. Server 808 receives information from system 100 through transceivers. As shown in block 822, the data received from system 100 may be processed and stored. As is further shown, server 808 may include a tracking system 824 and a performance system 826 and tracks the performance of system 100 over time. Further, a user 810 coupled to server 808 (see FIG. 7) can be alerted to alarms, can initiate software updates, and otherwise may monitor and control system 100. In some embodiments, system 100 communicates with server 808 utilizing any communication scheme, for example SMS messaging. In some embodiments, data encryption may be utilized. In some embodiments, system 100 may utilized a particular phone number for reporting of alarms resulting from faults. In some embodiments, a SMS message length is typically 256 bytes. For example, 40 bytes may be utilized for sending data related to analog inputs to DAS 520. Binary fault flags can be sent in further bytes of the SMS message. Monitored parameters may include, for example, the leak detectors, temperature, voltage and current from flow cell battery 112, voltage and current across load, pump currents and rotational frequencies, hour meters, availability of power source and/or generator. Any of this data may be stored in databases, for example in a spreadsheet, in server 808.

Server 808 may perform alarm processing, status reports, software updates, phone number updates, and other functions. Alarm processing can include processing, authentication, recordation, transmission of alarm message to critical personal, acknowledging the alarm to system 100, and providing an estimated time for service to system 100.

The time to service is the amount of time estimated for service personnel to arrive and repair the problem that resulted in the alarm. In some embodiments, system 100 may ignore the alarm once the time to service is received, provided the alarm is not the result of a critical functionality. In some embodiments, if the time of service is not received system 100 can continue to provide the alarm at subsequent intervals until a time of service is provided.

In some embodiments, server 808 may submit a status request to a system 100. In response, system 100 may process the status request and provide the requested data, in addition to its reporting functions. In some embodiments, messages to and from system 100 can be encrypted. In some embodiments, server 808 may also maintain service functions such as client billings, client reports, and other functions.

Figure 9:
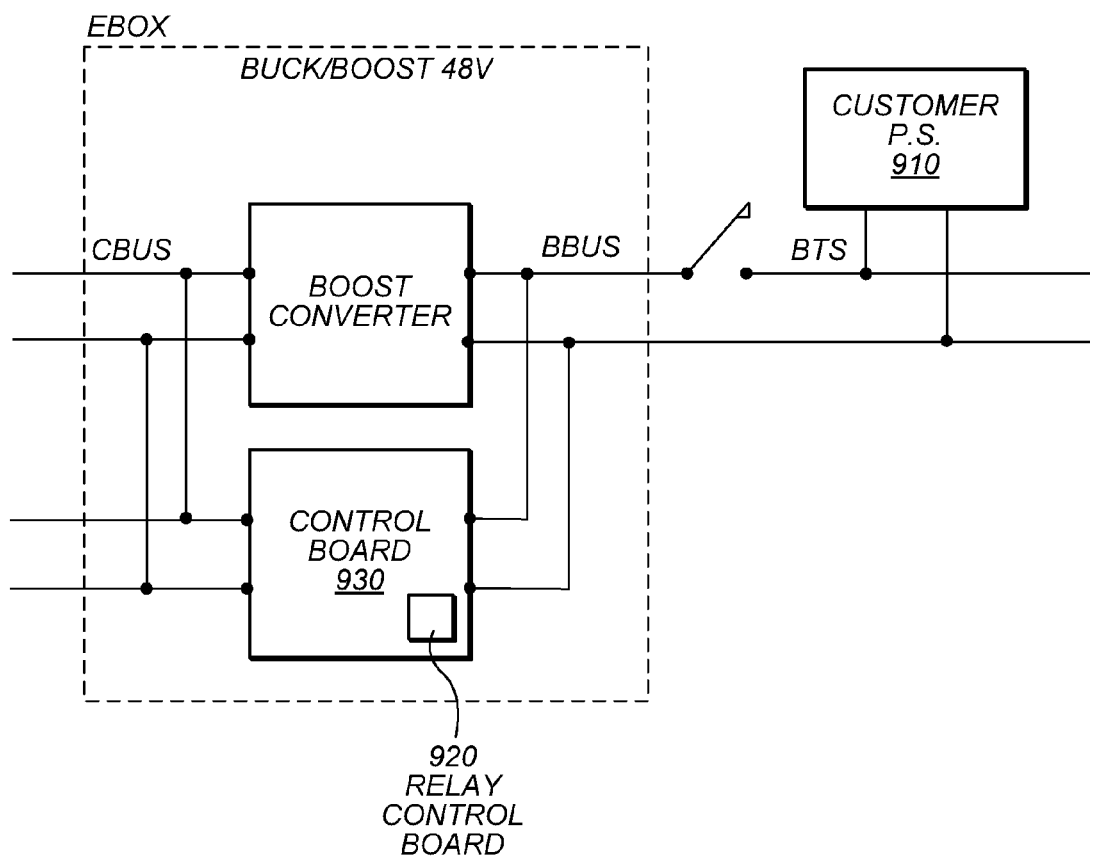
FIG. 9 illustrates a schematic of control board system having a relay control board.

An example of a relay control board that may be used with a controller system 130 as disclosed herein is depicted schematically in FIG. 9. In an embodiment, it is desired to operate a normally off mechanical relay to isolate the output of our 48V DC B-Bus from powering the external load in BTS in the event of any faults such as a short circuited B-Bus output or if there is any under voltage at the Boost converter output which will affect the functioning of customer side BTS power supply. As shown in FIG. 9, the customer side power supply 910 is also connected to the B-Bus. If there is short circuit or under voltage of less than 30V DC at BTS on account of any fault in the customer's power supply, the controller is designed so that the relay contacts will open and isolate the Boost output. An indication that there is a fault at their side of the power supply may be displayed.

The relay control board 920 includes an electronic control board and an electro-mechanical relay. Relay control board 920 may be mounted on the main control board 930 and the electromechanical relay is mounted on the bus bar which connects the B-Bus to the customer side BTS. A cut may be provided in the bus bar to mount the contacts of the mechanical relay so that if a fault, such as an output short circuit or output under voltage occurs in the output of the Boost converter of the Buck/Boost regulator, the contacts of the mechanical relay will open up and isolate the Buck/Boost from the BTS.

When the Buck/Boost converter turns on, a nominal 48V, in one embodiment, will be available at the output of the Boost converter. The same 48V from the Buck/Boost would also be available in the Control Board. This B-Bus voltage is sensed by the relay control board and will turn on the mechanical relay whose N/O contacts will close and connect the Boost output to the BTS.

If there is any short circuit at the output of the Boost converter or if the output of the Boost converter goes down to 30V+/−2V (in certain embodiments where the nominal is 48V), the fault will be sensed by the Relay Control board and switch off the relay, its contacts will open; thus isolating the Boost converter output from the BTS. On the other hand, when the output voltage of the Boost recovers to 40V+/−2V DC the relay will be energized by the Relay Control board and its contacts will close thus allowing the Boost converter output to be connected back to the BTS.

Figure 10:
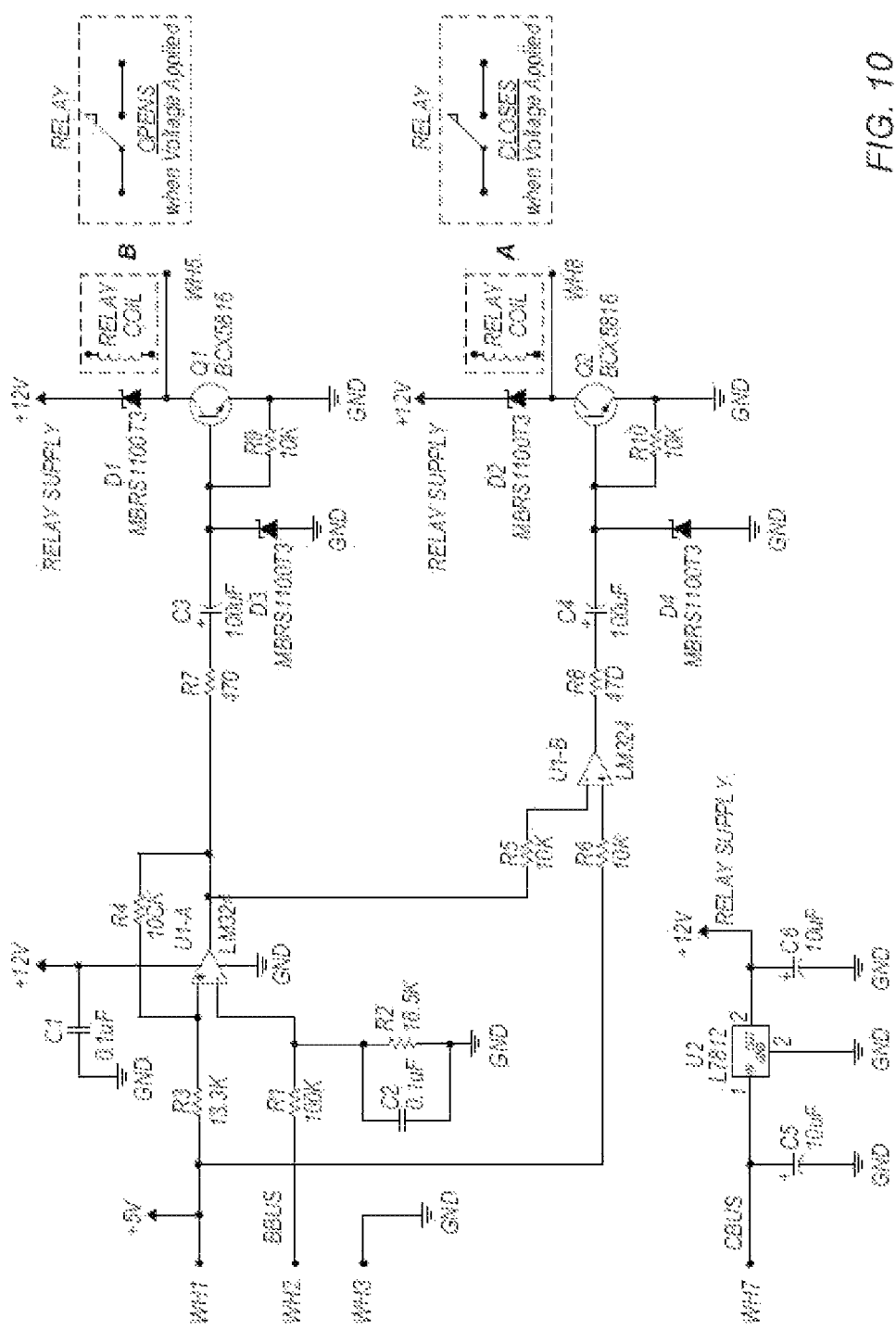
FIG. 10 depicts a schematic of an embodiment of a relay control board

FIG. 10 depicts a schematic of an embodiment of a relay control board. The relay Control Board depicted in FIG. 10 requires a 12V DC, however this voltage is coming from the 24V C-Bus, rather than using the 12V from the 12V regulator in the Control Board. 5V DC voltage taken from the 5V regulator in the Control Board is connected to the Relay Control Board to provide a reference voltage the comparator circuit. The mechanical relay has 12V DC coil voltage but may use a 24V DC relay. A regulator U2 is used to convert 24V to 12V for this purpose.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A controller for controlling a flow cell battery system, comprising:
one or more processors operating the flow cell battery system in multiple states, the multiple states comprising:
a plating state, wherein in the plating state, at least a portion of electrodes in the flow cell battery system are plated with a plating metal;
a charging state, wherein in the charging state, at least a portion of the electrolytes in the flow cell battery system are brought to a charged chemical state; and
a discharge state, wherein power is supplied to a load coupled to the flow cell battery system in the discharge state;
wherein the controller switches the flow cell battery system from the plating state to the charging state when a current through the electrodes of the flow cell battery system drops below a current threshold indicating that the plating of the portion of the electrodes is complete.

2. The controller of claim 1, wherein the controller switches the flow cell battery system from the charging state to the discharge state when power to the flow cell battery system is disconnected and the load is coupled to the flow cell battery system.

3. The controller of claim 1, wherein the flow cell battery system further comprises a float state, wherein in the float state power supplied to the electrodes is reduced with respect to power supplied to the electrodes during the charging state, and wherein the controller switches the flow cell battery system from the charging state to the float state when a state of charge of the flow cell battery is greater than a predetermined charged set point and power is supplied to the flow cell battery system.

4. The controller of claim 3, wherein the controller switches the flow cell battery system from the float state to the discharge state when the supplied power to the flow cell battery system is disconnected and the load is coupled to the flow cell battery system.

5. The controller of claim 1, wherein the flow cell battery system further comprises a hibernation state, and wherein the controller switches the flow cell battery system from the discharge state to the hibernation state when a state of charge of a flow cell battery in the flow cell battery system is less than a predetermined discharged set point and no power is being supplied to the flow cell battery system.

6. The controller of claim 5, wherein the controller switches the flow cell battery system from the hibernation state to the charging state when power is supplied to the flow cell battery system.

7. The controller of claim 1, wherein the controller switches the flow cell battery system from the discharge state to the charging state when power is supplied to the flow cell battery system during the discharge state and a state of charge of the flow cell battery system is less than a predetermined charged set point.

8. The controller of claim 1, wherein the flow cell battery system further comprises a shutdown state, and wherein the controller switches the flow cell battery system from any state to the shutdown state when a fault is detected.

9. The controller of claim 8, wherein the flow cell battery system further comprises an initialization state, wherein the controller switches the flow cell battery system to the initialization state when power is supplied to the flow cell battery system operating in the shutdown state.

10. The controller of claim 9, wherein the controller switches the flow cell battery system to the plating state when the initialization state is complete.

11. The controller of claim 1, wherein if there is any short circuit at an output of a Boost converter or if the output of the Boost converter goes below a predetermined voltage, a fault will be sensed by a Relay Control board, and the controller isolates the Boost converter output from the load, and if a short is sensed at the load the Relay Control Board isolates the Boost converter.

12. The controller of claim 1, wherein the processors are configured to control pump flow based on levels of electrolyte tanks and a state of charge of the electrolytes.

13. The controller of claim 1, further comprising a communication device coupled to the one or more processors, wherein the communication device transmits data external to the flow cell battery system.

14. The controller of claim 1, further comprising one or more processors operating a rebalance cell and wherein the one or more processors operating the flow cell battery system in multiple states are in communication with the one or more processors operating the rebalance cell.

15. A method of operating a flow cell battery system, comprising:
operating the flow cell battery system using a controller capable of transitioning the flow cell battery system into a plurality of operating states, the plurality of operating states comprising:
a plating state, wherein in the plating state, at least a portion of electrodes in the flow cell battery system are plated with a plating metal;
a charging state, wherein in the charging state, at least a portion of the electrolytes in the flow cell battery system are brought to a charged chemical state;
a discharge state, wherein power is supplied to a load coupled to the flow cell battery system in the discharge state; and
switching the flow cell battery system from the plating state to the charging state when a voltage across the electrodes of the flow cell battery system increases above a voltage threshold indicating that the plating of the portion of the electrodes is complete.

16. The method of claim 15, further comprising switching the flow cell battery system from the charging state to the discharge state when power to the flow cell battery system is disconnected and the load is coupled to the flow cell battery system.

17. The method of claim 15, wherein the operating states further comprise a float state, wherein in the float state power supplied to the electrodes is reduced with respect to power supplied to the electrodes during the charging state, and wherein the method further comprises switching the flow cell battery system from the charging state to the float state when a state of charge of the flow cell battery is greater than a predetermined charged set point and power is supplied to the flow cell battery system.

18. The method of claim 17, further comprising switching the flow cell battery system from the float state to the discharge state when the supplied power to the flow cell battery system is disconnected and the load is coupled to the flow cell battery system.

19. The method of claim 15, wherein the operating states further comprise a hibernation state, and wherein the method further comprises switching the flow cell battery system from the discharge state to the hibernation state when a state of charge of the flow cell battery system is less than a predetermined discharged set point and no power is being supplied to the flow cell battery system.

20. The method of claim 19, further comprising switching the flow cell battery system from the hibernation state to the charging state when power is supplied to the flow cell battery system.

21. The method of claim 15, further comprising switching the flow cell battery system from the discharge state to the charging state when power is supplied to the flow cell battery system during the discharge state and a state of charge of a flow cell battery of the flow cell battery system is less than a predetermined charged set point.

22. The method of claim 15, wherein the operating states further comprise a shutdown state, and wherein the method further comprises switching the flow cell battery system from any state to the shutdown state when a fault is detected.

23. The method of claim 22, wherein the operating states further comprise an initialization state, and wherein the method further comprises switching the flow cell battery system to the initialization state when power is supplied to the flow cell battery system operating in the shutdown state.

24. The method of claim 23, further comprising switching the flow cell battery system to the plating state when the initialization state is complete.

* * * * *